United States Patent [19]
Kopylov et al.

[11] Patent Number: 5,573,571
[45] Date of Patent: Nov. 12, 1996

[54] METHOD FOR MAKING OPTICAL FIBER PREFORMS AND OPTICAL FIBERS FABRICATED THEREFROM

[75] Inventors: Nonna Kopylov, Scotch Plains; Ahmet R. Kortan, Warren, both of N.J.

[73] Assignee: Lucent Technologies Inc., Murray Hill, N.J.

[21] Appl. No.: 347,978

[22] Filed: Dec. 1, 1994

[51] Int. Cl.$^6$ .................................................. C03B 37/02
[52] U.S. Cl. ................... 65/388; 65/389; 65/404; 65/435; 65/188; 65/424
[58] Field of Search .................... 65/388, 389, 404, 65/424, 435, 533, 188

[56] References Cited

U.S. PATENT DOCUMENTS

| | | | |
|---|---|---|---|
| 3,399,983 | 9/1968 | Chapman | 65/188 |
| 3,650,703 | 3/1972 | Labelle | 65/188 |
| 3,726,656 | 4/1973 | Reid | 65/188 |
| 4,944,783 | 7/1990 | Hongo et al. | |
| 5,100,449 | 3/1992 | Cornelius | 65/435 |
| 5,106,400 | 4/1992 | Tick | |
| 5,160,521 | 11/1992 | Tran | |
| 5,215,564 | 6/1993 | Weber | |
| 5,285,518 | 2/1994 | Elyamani et al. | |
| 5,308,371 | 5/1994 | Kawamoto et al. | |

OTHER PUBLICATIONS

Ohishi et al., Fabrication of Fluoride Glass Single–Mode Fibers, Journal of Lightwave Technology, vol. LT–2, No. 5, pp. 592–595 (1984).
Mitachi et al., Fluoride–Glass–Cladded Optical Fibres For Mid–Infra–Red Ray Transmisson, Electronic Letters, vol. 17, No. 17, pp. 591–592.
Aggarwal et al., Fluoride Glass Fiber Optics, Academic Press, Inc., pp. 213–233 (1991).
France et al., Fluoride Glass Optical Fibres, Blackie and Son Ltd., pp. 101–121 (1990).
Tran et al., Fuoride Glass Preforms Prepared by a Rotational Casting Process, Electronics Letters, vol. 18, pp. 657–658 (1982).
John Wiley & Sons, Encyclopedia of Chemical Technology, pp. 131–133 (1980).

Primary Examiner—David A. Simmons
Assistant Examiner—John Hoffmann

[57] ABSTRACT

A method and apparatus are provided for drawing a self-aligned core fiber free of surface contamination and inserting the core fiber into a cladding material to make an optical fiber preform. Single or multi-mode optical fibers having high quality core-clad interfaces can be directly drawn from the preforms described herein.

21 Claims, 6 Drawing Sheets

METHOD FOR MAKING OPTICAL FIBER PREFORMS AND OPTICAL FIBERS FABRICATED THEREFROM

BACKGROUND OF THE INVENTION

1. Field of the Invention

The present invention relates generally to multi-mode and single mode optical fibers. Specifically, the invention relates to a novel method for drawing and inserting a core fiber into a cladding material to form an optical fiber preform having a high quality core-clad interface for use in fabricating a low loss optical fiber.

2. Description of the Related Art

Single mode optical fibers that transmit both visible and infrared energy are desirable for use in long distance communications systems. Minimization of transmission loss is particularly important in preparing optical fibers for use in long distance applications. Conventional methods for fabricating optical fibers involve casting glass melts into glass preforms which are then drawn into optical fibers.

Preforms comprising multicomponent fluoride glasses are typically used to fabricate low loss optical fibers, particularly, single mode fibers which can carry signals over distances of several thousand kilometers without the need for repeaters that regenerate the signal. Multicomponent fluoride glasses are particularly susceptible to crystallite formation since these glasses have significantly lower theoretical transparencies than silica glasses and exhibit low viscosities at their liquidus temperatures. Furthermore, the melts of multicomponent glasses are reactive with ambient gases and crucible materials which increases their susceptibility to crystallization and contamination.

Conventional methods for making optical fiber preforms expose the core and cladding materials to temperatures exceeding crystallization temperatures during the addition of the core material to the cladding material. These methods involve cooling a cladding glass melt and a subsequent reheating of the cladding glass to temperatures greater than the crystallization temperature upon the addition of a core glass melt to the cladding glass. Conventional methods for forming optical fiber preforms such as, for example, suction casting, build-in-casting, rotational casting and rod-in-tube casting are described in Chapter 5 of *Fluoride Glass Fiber Optics*, Academic Press, Inc., edited by Ishivar D. Aggarwal and Grant Lu, pp. 223–227 (1991). See also, for example, U.S. Pat. Nos. 4,793,842, 5,106,400 and 5,160,521 the disclosures of which are incorporated herein by reference.

Preforms cast by conventional methods must be modified before being drawn into single mode fibers having desired core and cladding diameters. Examples of such modifications include stretching procedures at high temperatures which further increase crystallite formation and multiple jacketing procedures.

SUMMARY OF THE INVENTION

The subject invention is directed to a method for making an optical fiber preform utilizing a movable fiber drawing member. The method comprises the steps of axially aligning a fiber drawing member and a containment vessel having a molten core material contained therein, and moving at least an end portion of the fiber drawing member into the containment vessel so as to contact the molten core material. The viscosity of the core material is then increased to at least about $10^5$ poises, and the end portion of the fiber drawing member is removed from the containment vessel so as to form a core fiber from the core material. Thereafter, the core fiber is cleaved at a predetermined location spaced from the end portion of the fiber drawing member to form a core fiber having a predetermined length. Subsequently, the length of the core fiber is aligned with a second containment vessel having a molten cladding material contained therein and the fiber drawing member is moved toward the second containment vessel so as to introduce the length of core fiber into an inner portion of the molten cladding material to form an optical fiber preform. Preferably, the method further comprises inserting the core fiber into the cladding material under vacuum or inert atmosphere. The core fiber is preferably inserted into the cladding material when the temperature of the inner portion of the cladding material is below the crystallization temperature and above the glass transition temperature to provide a preform having a high quality core-clad interface.

A method for making an optical fiber is also provided comprising the steps of forming the optical fiber preform and drawing the preform into an optical fiber. Optical fibers including multi-mode or single mode fibers having desirable core-clad ratios, may be directly drawn from the preforms described herein without the need for modifications of the preforms. In one aspect, single mode heavy metal fluoride optical fibers are directly drawn from the preforms cast in accordance with the method described herein.

The subject invention is also directed to an apparatus for making an optical fiber preform which comprises a carriage slidably mounted on a support structure and configured to translate in a plane of movement with respect to the support structure. Means are associated with the carriage for supporting at least a portion of a core fiber, and a platform is associated with the support structure to receive a containment vessel. The platform is configured for movement in a plane perpendicular to the plane in which the carriage translates. The apparatus also includes a mechanism for moving the platform in such a manner so as to axially align a containment vessel and a core fiber supported by the fiber supporting means. Mechanism for heating a containment vessel and an end portion of the core fiber supporting means are also provided.

DETAILED DESCRIPTION OF THE PREFERRED EMBODIMENTS

Preforms prepared in accordance with the method described herein include core and cladding materials. The core and cladding materials are preferably composed of glasses, particularly heavy metal nonoxide glasses or oxide glasses. Core and cladding glasses described herein are prepared under dry inert conditions from high purity commercially available reagents. Materials which exhibit a greater viscosity change with temperature are desirable for use in preparing the preforms since they offer a decreased resistance to the inserted core fiber. Glasses comprising silicates, borates, halides, or chalcogenides are useful materials for preparing the preforms. Multicomponent glasses including one or more glass formers such as silicon oxide or boron oxide and other metal oxides which are not glass formers can be used to make the preforms. The present invention is not limited to use of any of these particular glasses. Indeed, one Skilled in the art can employ various other materials to prepare the preforms in accordance with the method described herein. The core insertion method of the present invention is especially useful for making preforms comprising grossly different core and cladding materials having dissimilar indices of refraction and thermal expansion coefficients. For example, the core fiber may comprise halides and the cladding material may comprise silicate glass.

Particular glass compositions can be combined to achieve larger numerical apertures and vary indices of refraction. The composition of the cladding glass should preferably have a lower index of refraction than that of the core glass. Useful dopants for modifying the refractive indices of the core and cladding glass compositions are $LiF$, $HfF_4$, $PbF_2$, $AlF_3$ and $BiF_3$. Halide glasses, particularly heavy metal fluoride glasses (HMF), are preferred materials for preparing optical fibers due to their low phonon energy and wide transmission window. HMF glasses are also desirable hosts for rare earth doping since they have a high solubility for rare earth ions.

HMF glasses have narrow working temperature ranges of about 80° C. to about 150° C. between crystallization temperatures ($T_x$) and glass transition temperatures ($T_g$). Preforms comprising HMF glasses produced by conventional casting methods are particularly susceptible to crystallite formation upon the exposure of the glasses to temperatures near or above crystallization temperatures. Thus, the core insertion method described herein is particularly useful for preparing HMF glass preforms. Preferably, the core and cladding glasses comprise fluorozirconates having zirconium fluoride as the predominant component as well as modifiers and stabilizers comprising fluorides of barium, lanthanum, sodium, aluminum, lithium, gadolinium and lead. Examples of suitable fluorozirconate glasses include zirconium-barium-gadolinium fluoride (ZBG), zirconium-barium-gadolinium-aluminum fluoride (ZBGA) and zirconium-barium-lanthanum-aluminum fluoride (ZBLA). A preferred glass for use in fabricating the preforms is ZBLAN glass which is formed by the addition of sodium fluoride to further stabilize ZBLA glass. The most preferred cladding glass for use with this invention is HBLAN glass wherein hafnium tetrafluoride ($HfF_4$) is substituted for zirconium fluoride ($ZrF_4$) to reduce the index of refraction of the ZBLAN glass. The most preferred core glass is ZBLAN glass doped with up to 10% $PbF_2$ to increase the index of refraction. Other useful dopants for modifying the refractive indices of the fluoride glass compositions are $LiF$, $AlF_3$ and $BiF_3$.

The method described herein for forming a core fiber and inserting the core fiber into a cladding material is preferably performed in a glove box having a controlled atmosphere.

Figure 1:
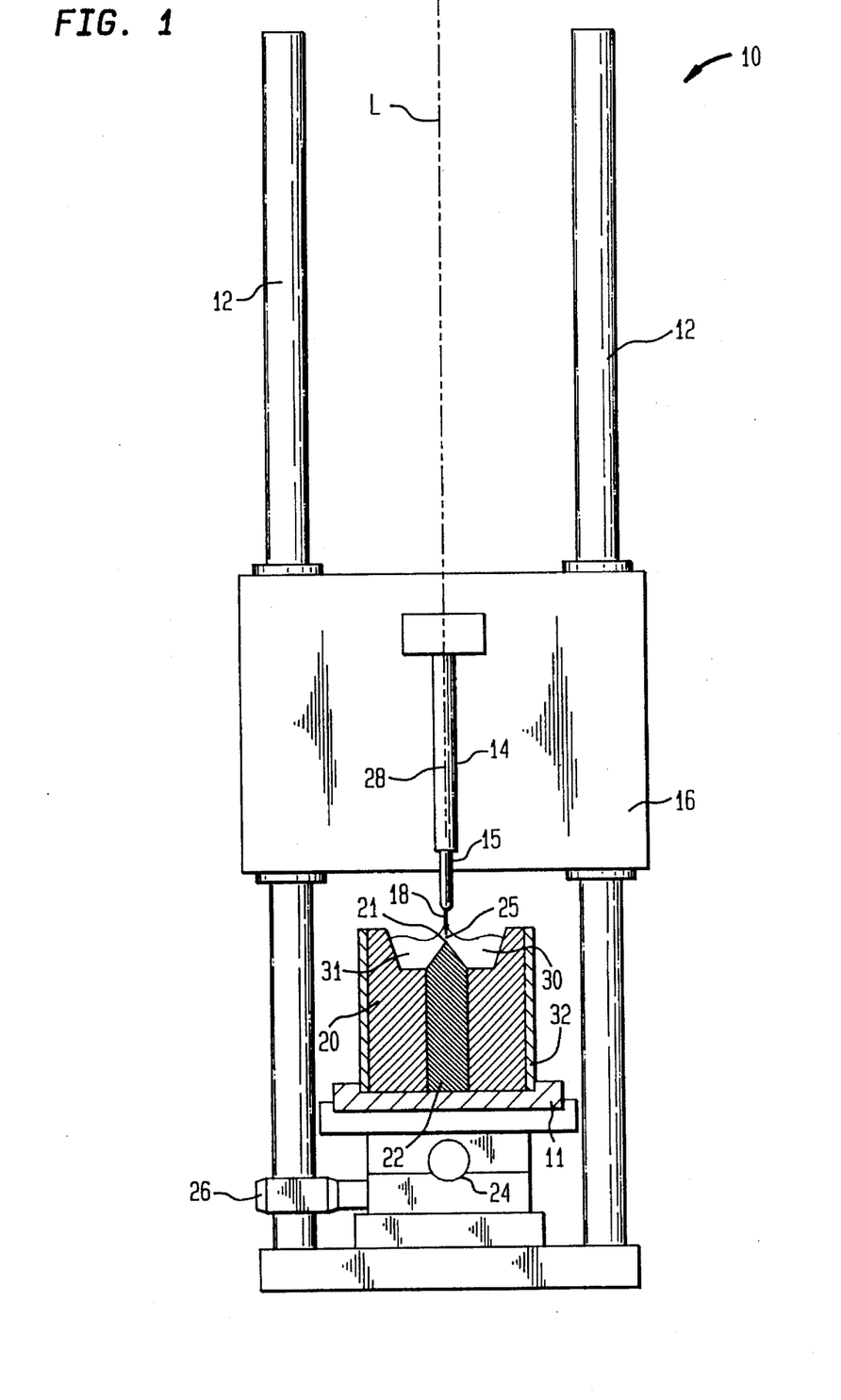
FIG. 1 is a side view in cross-section of an apparatus for forming and inserting a self-aligned core fiber into a cladding material to form a preform in accordance with the present invention wherein an end portion of a fiber drawing member is moved into a first containment vessel to contact a core material disposed therein.

With reference to FIG. 1, an apparatus, designated generally by reference numeral 10, in accordance with one embodiment of the present invention includes a platform 11 associated with a support structure 12 wherein platform 11 is configured for receiving a containment vessel. A fiber drawing member 14 is associated with a carriage 16 slidably mounted on support structure 12, wherein support structure 12 defines an axis generally parallel thereto designated by reference "L". Carriage 16 is adapted to reciprocally translate along the aforementioned "L" axis as defined by support structure 12. Further, platform 11 is configured to reciprocally translate in a plane perpendicular to the plane in which the carriage 16 translates so as to effect axial alignment of a temperature controlled end portion 18 of fiber drawing member 14 with a conical end portion 21 of a cylinder 22. The cylinder 22 is preferably disposed in the central portion of a first containment vessel 20 upon platform 11. Preferably, the fiber drawing member 14 has a tapered end portion, wherein the tapered end portion 18 includes platinum, gold, or carbon. However, it is appreciated that the tapered end portion 18 is not to be limited to platinum, gold, or carbon, but rather may encompass any substitutable material, i.e., a material that does not react with the molten glass. In the present preferred embodiment, the fiber drawing member 14 is preferably configured to have a removable portion 15 including the end portion 18.

The apparatus 10 further includes a first actuating mechanism 24 configured for effecting movement of platform 11 in a first linear direction and a second actuating mechanism 26 configured for effecting movement of platform 11 in a second linear direction, wherein the second linear direction is generally perpendicular to the aforementioned first linear direction. However, it is to be appreciated that platform 11 is not to be limited to the foregoing first and second linear directions but rather may be configured for movement in any direction along a plane generally perpendicular to the plane in which carriage 16 translates. The apparatus 10 further includes a heating mechanism 28 operatively associated with the fiber drawing member 14, whereby the heating mechanism 28 is configured to maintain the temperature of the fiber drawing member end portion 18 at a constant temperature somewhat less than the glass softening temperature of the core material to prevent damage to the interface between the core fiber and the end portion 18, by thermal expansion. The end portion 18 of the fiber drawing member 14 is preferably maintained at a temperature of from about 230° C. to about 260° C. Preferably, the diameter of end portion 18 is about 0.5 mm to about 6 mm. A diameter of from about 1.0 mm to about 1.5 mm is preferred, and a diameter of 1 mm is most preferred.

Core material prepared from high purity commercially available reagents in a controlled atmosphere glove box is melted, preferably, in a vitrous carbon or platinum crucible under a dry argon or reactive sulfur-hexafluoride atmosphere at temperatures of from about 700° C. to about 1000° C. A core material melted in a vitrous carbon crucible can then be exposed to an oxygen atmosphere to remove carbon particles from the material.

With continued reference to FIG. 1, molten core material 30 is introduced into a chamber 31 as defined by the first containment vessel 20. The first vessel 20 is preferably a cylindrical brass quencher wherein the chamber 31 includes a metallic coating. A heating mechanism 32 is associated with the first vessel 20 to maintain the temperature of first vessel 20 at a constant temperature somewhat less than the glass transition temperature. The temperature of first vessel 20 is preferably less than about 260° C. A vessel temperature of about 200° C. is most preferred for providing a core material having a desired viscosity for drawing a clear and undamaged core fiber. The core material 30 solidifies from the outer portion of the core material adjacent the peripheral wall of the first containment vessel 20 toward the inner portion of the core material. The core material constricts as it solidifies forming a crest 25 (FIG. 1) over the conical end portion of cylinder 22 in first vessel 20. It is to be appreciated that such heating mechanism 32 is well known in the art and need not be described hereinafter.

Figure 1A:
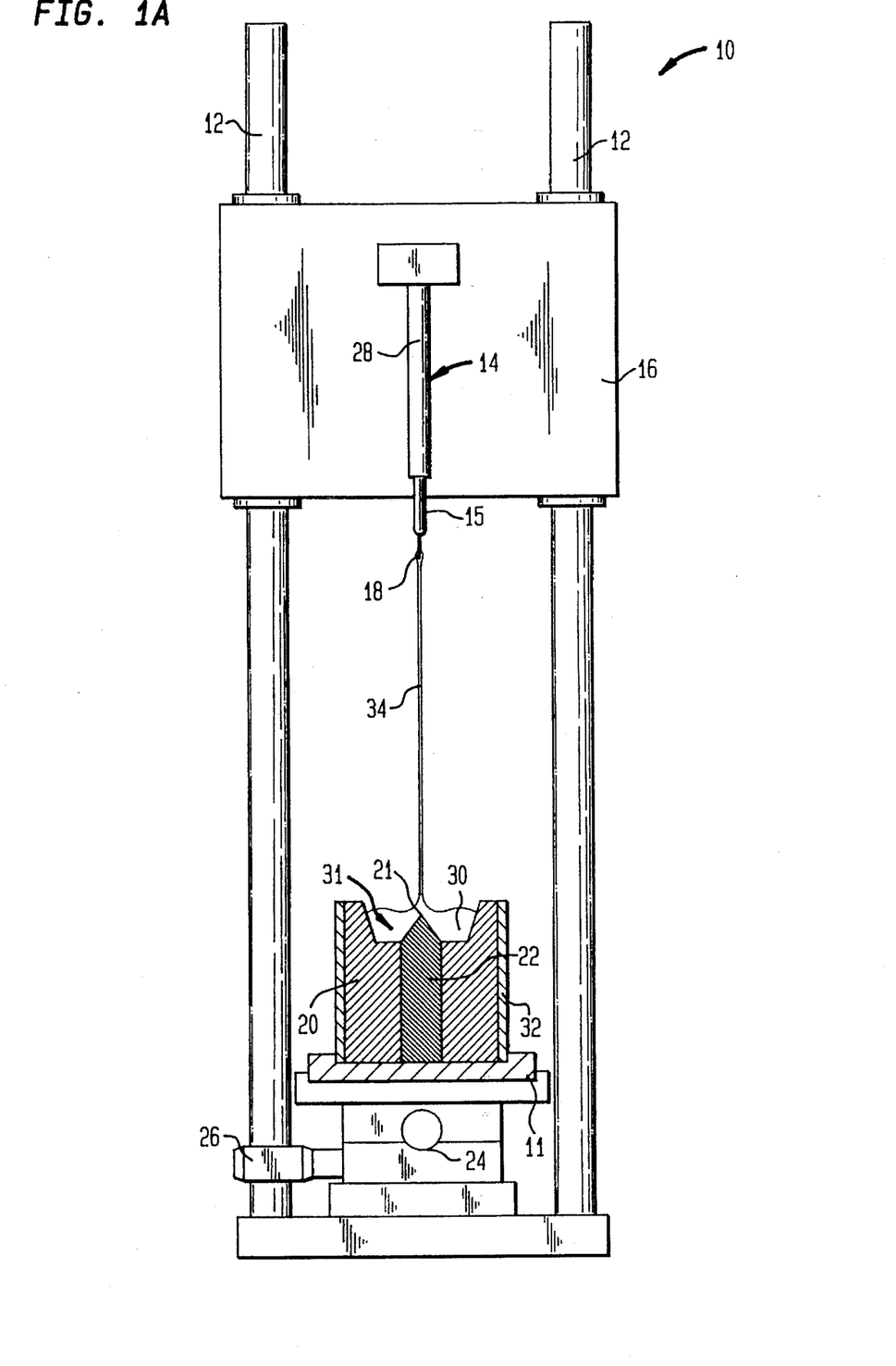
FIG. 1A is a side view in cross-section of the core fiber drawing and preform casting apparatus illustrating formation of a core fiber from core material in the first containment vessel.
Figure 1B:
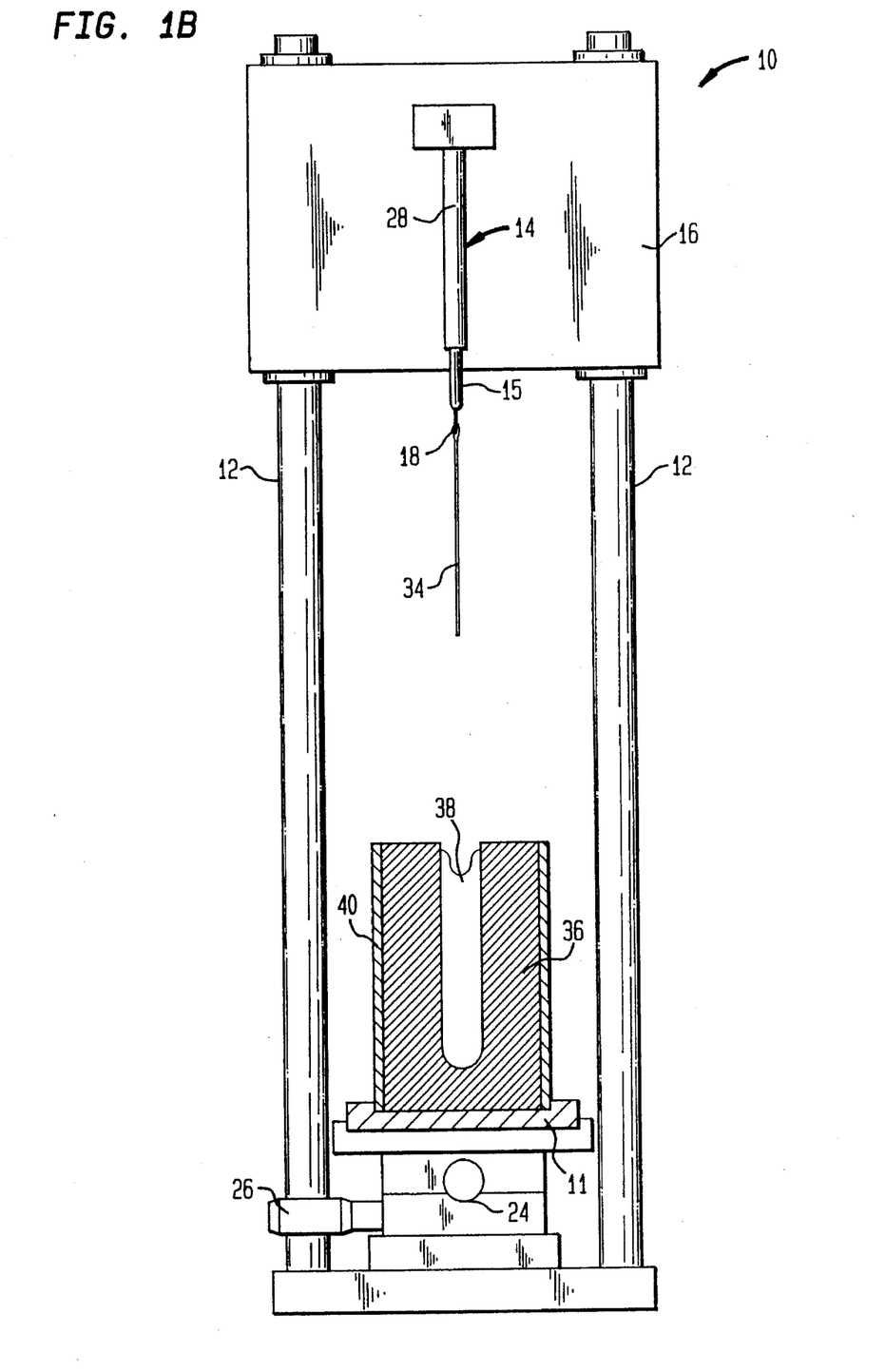
FIG. 1B is a side view in cross-section of the core fiber drawing and preform casting apparatus illustrating a core fiber attached to an end portion of the fiber drawing member.
Figure 1C:
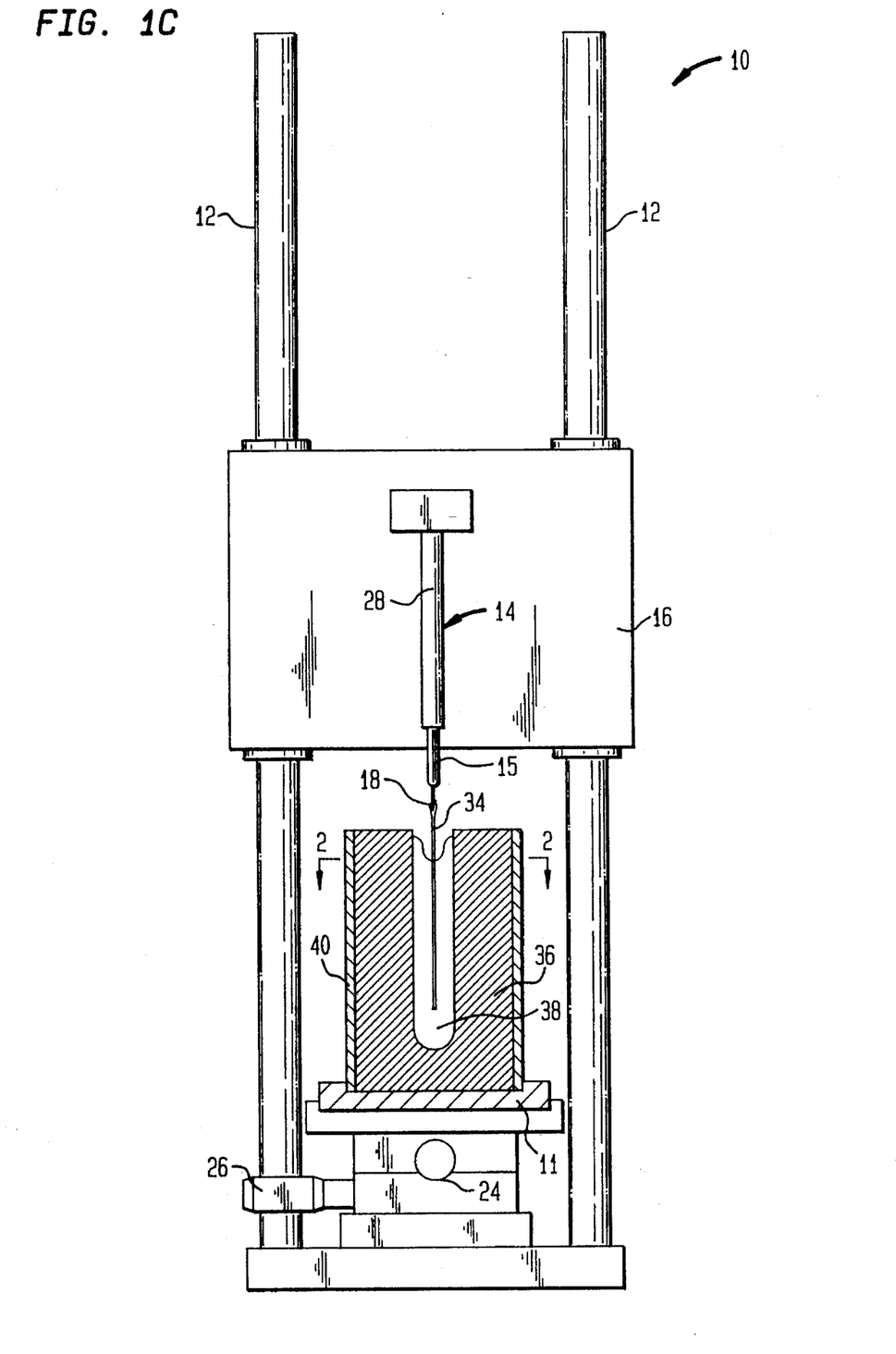
FIG. 1C is a side view in cross-section of the core fiber drawing and preform casting apparatus of the present invention illustrating insertion of a core fiber into a cladding material in a containment vessel located on a platform of the apparatus.

Referring now to FIGS. 1A–1C, in conjunction with FIG. 1, the operation of apparatus 10 will now be described. The end portion 18 of fiber drawing member 14 is introduced into the first vessel 20 to contact the crest 25 of the solidifying core glass 30, as shown in FIG. 1. Referring to FIG. 1A, carriage 16 is approximated away from the first vessel 20 so as to form a core fiber 34 from the first vessel 20. A first end of core fiber 34 remains attached to end portion 18 after core fiber 34 is drawn from the core material 30. The carriage 16 is preferably translated when the viscosity of the core material 30 reaches about $10^6$ poises.

It is to be appreciated that a core fiber drawn to a diameter of about 50 to about 2000 microns is preferred for use in making a preform to be drawn into a single mode fiber. The diameter of a core fiber is dependent on the viscosity of the core material and the speed at which the core fiber is drawn. Core fibers having smaller diameters can be obtained by increasing the draw speed. Conversely, core fibers having larger diameters can be obtained by decreasing the draw speed.

Core fiber 34 is preferably drawn from core material 30 approximately 1 minute after pouring the core material 30 into the first vessel 20. The core fiber 34 is formed at a draw speed of from about 1.25 centimeters to about 5 centimeters per second. Preferably, the core fiber 34 is drawn to a length of about 0.5 centimeters to about 50 centimeters.

The temperature of core material 30 is preferably above the glass transition temperature and below the crystallization temperature of the core material at the time of drawing the core fiber 34. It is noted, that for a core material comprising ZBLAN glass, the core fiber is preferably drawn when the glass has a temperature of about 310° C. to obtain a core fiber having a diameter of about less than 2 mm. A core fiber having a larger diameter of about greater than 2 mm can be obtained when the core fiber is drawn from a core material having a temperature of about 300° C. or less and a viscosity of about greater than $10^7$ poises.

Referring to FIG. 1B, core fiber 34 is cleaved at a predetermined location spaced from the end portion of the core fiber to a length of from about 5 mm to about 200 mm. The core fiber 34 remains attached to the end portion 18 of fiber drawing member 14.

The core fiber can have a circular or non-circular cross-sectional geometry. Examples of non-circular shaped core fibers include square, triangular, elliptical and helical core fibers. The shape of a core fiber 34 is determined by the shape of the end portion 18 of the fiber drawing member 14. The core fibers described herein are free of surface hydroxide compounds which typically form on fibers when they are exposed to parts per million levels of moisture for extended periods, since the core fibers are drawn and not handled prior to directly inserting the core fiber into a cladding material.

With continued reference to FIG. 1B, the first vessel 20 is removed from platform 11 and a second containment vessel 36 is placed on platform 11. Platform 11 is then moved to align the core fiber 34 with the central portion of second vessel 36.

A cladding material 38 prepared from high purity commercially available reagents in a controlled atmosphere glove box is melted, preferably, in a platinum or vitrous carbon crucible at a temperature of about 800° C. in an $SF_6$ atmosphere. The cladding material can then further be exposed to a dilute oxygen atmosphere to remove carbon particles.

Molten cladding material 38 cooled to about 600° to about 700° C. is introduced into a preheated temperature controlled second vessel 36 to form an inner cladding portion and an outer cladding portion in the vessel. Second vessel 36 is preferably a mold having a cylindrical chamber and a peripheral wall. The cylindrical chamber of second vessel 36 also preferably includes a metallic coating. A heating mechanism 40 associated with second vessel 36 is employed to maintain the temperature of the vessel at a constant temperature somewhat less than the glass transition temperature ($T_g$) during the core insertion procedure. The temperature of second vessel 36 is preferably maintained at about 260° C.

Referring now to FIG. 1C, carriage 16 is translated along the aforementioned "L" axis as defined by support structure 12 to rapidly insert the core fiber 34 into the inner portion of the cladding material 38 immediately before the inner cladding material completely solidifies. The present invention provides a method for precise axial insertion of the core fiber 34 into the cladding material 38. The core fibers described herein are self-aligned, i.e., the core fibers are drawn from the core material 30 and directly inserted into the cladding material 38 along the same aforementioned "L" axis thereby avoiding damage to the core fiber and ensuring successful insertion of the core fiber into the cladding material.

Figure 2:
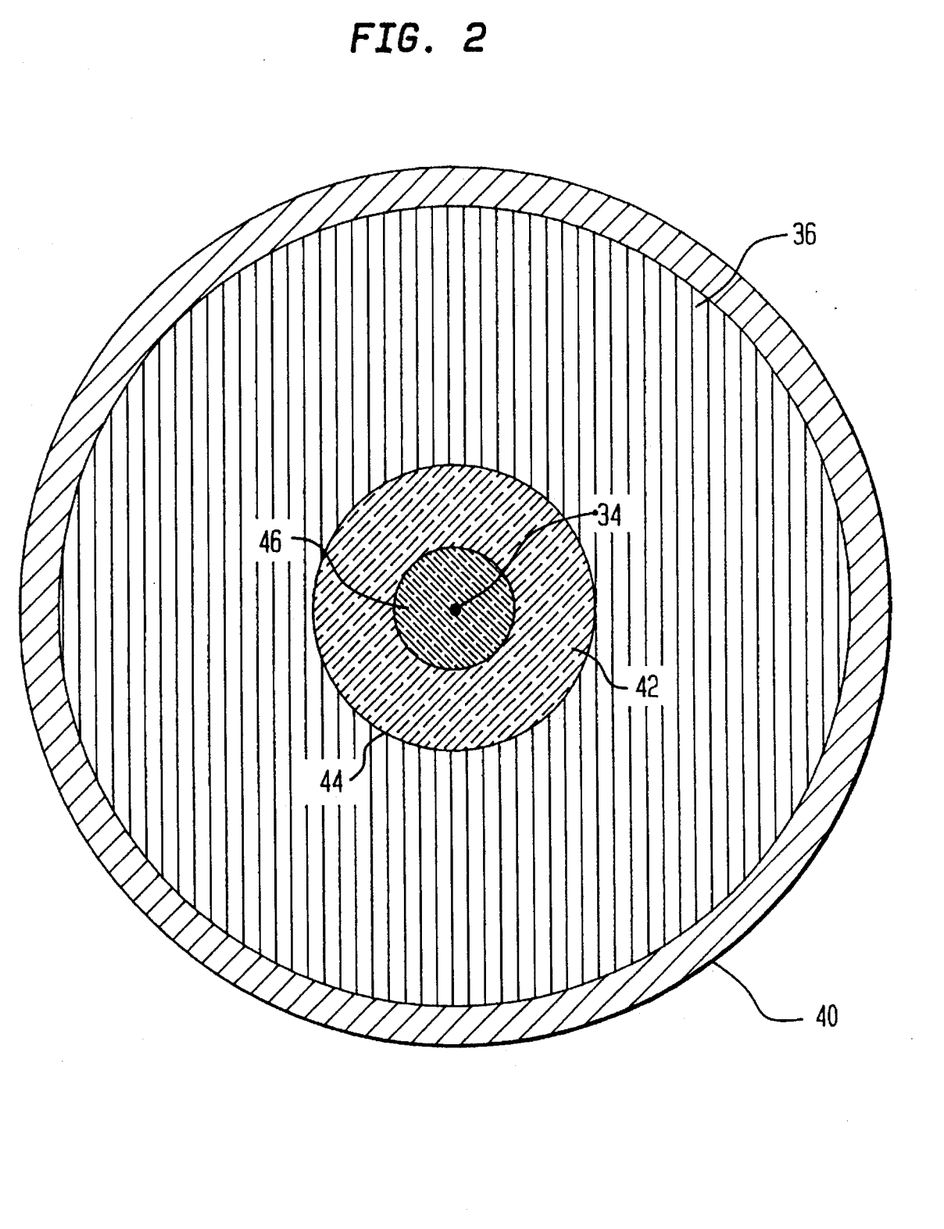
FIG. 2 is a cross-sectional view of a second containment vessel on the platform of the core fiber drawing and preform casting apparatus taken along lines 2—2 of FIG. 1C illustrating the relationship between the outer and inner portion of the cladding material relative to the core fiber during the formation of the preform.

The temperature of the inner cladding portion at the time of insertion of the core fiber is below the crystallization temperature ($T_x$) and above the glass transition temperature ($T_g$). With reference to FIG. 2, once the cladding material 38 is introduced into the second vessel 36, solidification of the cladding material occurs from the outer portion of the cladding material 42 adjacent to the inner wall 44 of the second vessel 36 toward the inner portion of the cladding material 46 into which the core fiber 34 is inserted. At the time of insertion of the core fiber, the outer cladding portion 42 is substantially solidified while the inner cladding portion 46 remains in a somewhat molten state. The core insertion should be performed rapidly so that the core fiber does not soften or dissolve during the procedure.

Upon insertion, the temperature of the core fiber increases to somewhat above the glass transition temperature and is then rapidly quenched avoiding bulk crystallization problems. Neither the core fiber nor cladding material are exposed to crystallization temperatures upon insertion of the core fiber into the cladding material. The core fiber is preferably inserted into the cladding material at the lowest possible temperature before the inner cladding portion completely solidifies so that the core fiber is not subjected to an undue amount of thermal stress. Since the temperature of the cladding glass decreases rapidly once it is introduced into second vessel 36, for a preform having a diameter of about 14 millimeters the core insertion time ($t_{CIT}$) is preferably from about 80 to about 100 seconds after introducing the cladding glass into second vessel 36. The core insertion time is greater for making preforms having larger diameters and shorter for making preforms having smaller diameters.

Acceptable temperatures for the core fiber at the time of insertion are temperatures below the glass transition temperature. The temperature of the core fiber at the time of insertion is preferably about room temperature. The temperature of the inner cladding portion at the time of insertion of the core fiber is below the crystallization temperature and above the glass transition temperature of the cladding material. The temperature of a fluoride glass cladding material at the time of introducing it into the mold is preferably about 600° C. to about 700° C. For a fluoride glass cladding material, the inner cladding portion is preferably about 15° C. to about 35° C. below the crystallization temperature at the time of insertion of the core fiber. For example, a core fiber should be inserted into a cladding material composed of ZBLAN glass having a crystallization temperature of about 355° C., when the temperature of the inner cladding portion is about 310° C. to about 340° C.

Figure 3A:
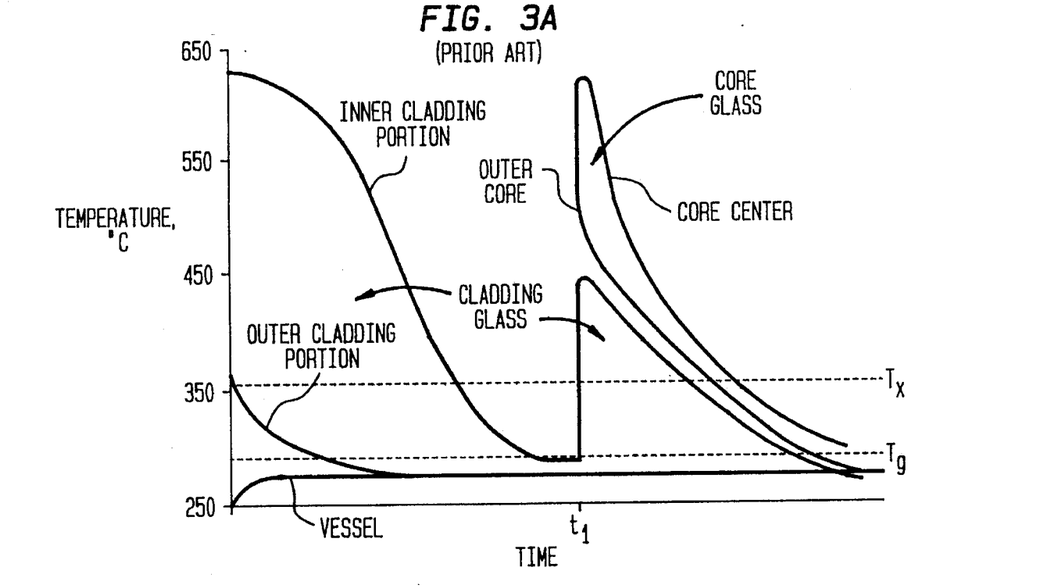
FIG. 3A is a graphic illustration of typical temperatures of the preform casting vessel, core material, and cladding material during a conventional preform casting method.
Figure 3B:
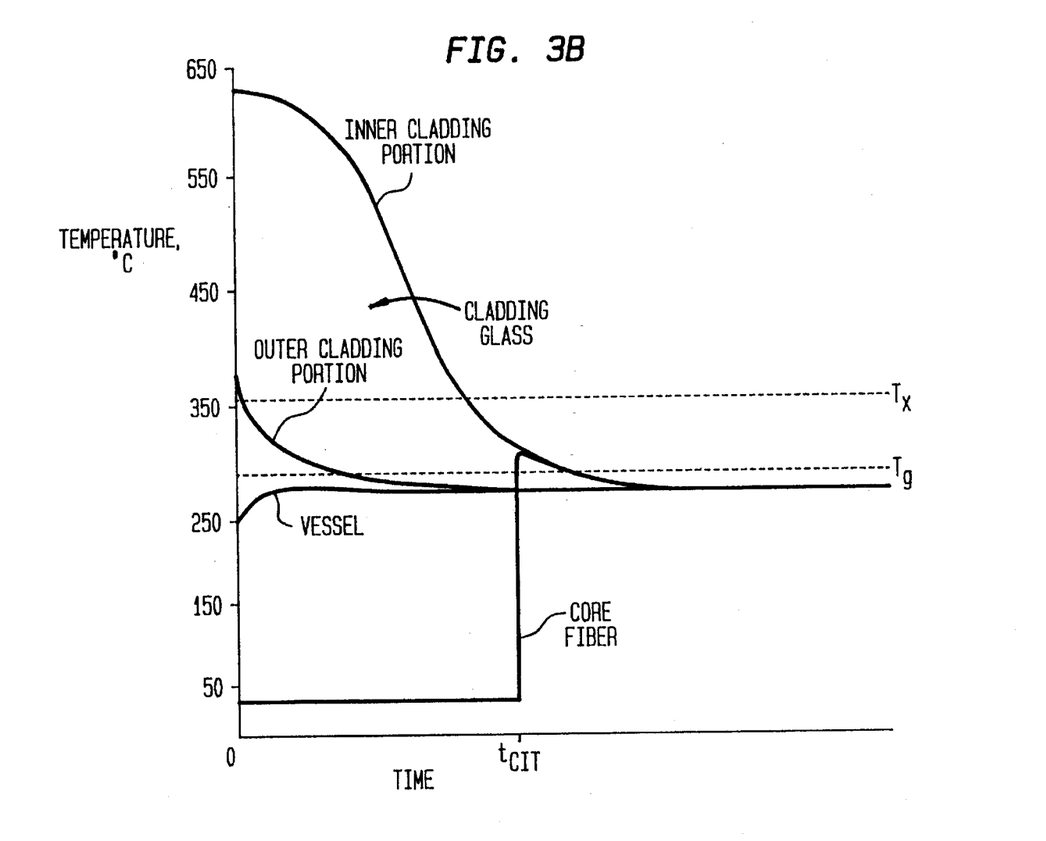
FIG. 3B is a graphic illustration of typical temperatures of the containment vessel core fiber and cladding material during the core insertion technique of the present invention.

FIG. 3A graphically illustrates typical temperatures of the preform casting vessel, core material and cladding material during a conventional preform casting method of the prior art. In contrast, FIG. 3B graphically illustrates typical temperatures of the containment vessel, core fiber, and cladding material during a core insertion technique of the present invention. The time at which the core melt is introduced into a cladding melt in the casting vessel of the conventional method is represented as $t_1$. The time at which the core fiber is inserted into the cladding material in accordance with the present invention is represented as $t_{CIT}$.

The apparatus depicted in FIGS. 1–1C is not intended to limit the type of casting apparatus for use in accordance with the present invention to any particular embodiment. One skilled in the art can envision various modifications to the apparatus for performing the core insertion technique described herein. In one embodiment, the apparatus includes means for automatically translating the carriage along a plane perpendicular to the plane in which the platform translates. In another embodiment, the apparatus includes a means associated with the containment vessel for detecting, controlling and displaying the temperature of the cladding material in the containment vessel. The apparatus can also include means for automatically inserting said core fiber into said cladding material when the cladding material reaches a desired temperature. In still another embodiment, the apparatus can include a timing means for inserting the core fiber into the cladding material at a predetermined time. Furthermore, a shutter fixed to the first end of the second vessel 36 can be employed to prevent surface cooling and contamination of the cladding material.

The containment vessel of the casting apparatus can have a circular or non-circular cross-sectional geometry for providing a preform including a cladding material having a circular or non-circular cross-sectional geometry. Furthermore, a preform obtained in accordance with the present invention can be introduced into a second cladding material in accordance with the method described herein. The cladding material of the preform can be reduced in size and/or altered in shape prior to insertion into the second cladding material. The resulting preform having two cladding layers can then be inserted into a third cladding material. Thus, preforms having multiple cladding layers can be obtained in accordance with the method described herein. For example, a preform prepared in accordance with the present invention can include a square inner cladding material surrounding a core fiber and an outer circular cladding material surrounding the inner cladding material.

After the preform is removed from the casting apparatus, it can then be directly drawn into an optical fiber having the desired core and cladding diameters without the need for modification of the preform by additional stretching and jacketing procedures. The optical fiber can be a single mode or multi-mode fiber. Fiber drawing methods are described in *Fluoride Glass Optical Fibers*, P. W. France et al., Blackie CRC Press Inc. pp. 114–116 (1990); *Encyclopedia of Chemical Technology*, John Wiley & Sons, Vol. 10, pp. 131–133 (1980) and *Fluoride Glass Fiber Optics*, I. D. Aggarwal and G. Lu, Academic Press, Inc. pp. 227–228 (1991) which are incorporated herein by reference.

Single mode fibers drawn from the preforms described herein have diameters of about 100 to about 200 microns and have core diameters of about less than 6 microns. Thus, the core diameter of a single mode optical fiber drawn from a preform prepared in accordance with the method described herein comprises about less than 3% to 6% of the diameter of the single mode fiber. The core to clad ratio of a preform prepared in accordance with the present invention is equal to the core to clad ratio of an optical fiber that is drawn from that preform. Thus, the necessary diameter of the core fiber to be inserted into the cladding material disposed in a containment vessel having a predetermined diameter is determined by the desired core to clad ratio of the optical fiber to be drawn from the preform. Core to clad ratios of about 0.005 to about 0.05 are preferred for single mode optical fibers.

For single mode propagation fibers normalized frequency V is less than or equal to 2.401. The normalized frequency parameter describes the relationship of the wavelength of the guided light propagating through the optical fiber core to the refractive indices of the core and the fiber cladding, and is expressed by the formula $$V=(2\pi a/\lambda)(n_{core}^2-n_{clad}^2)^{1/2}$$

wherein a is the radius of the core of the fiber, $\lambda$ is the wavelength of operation and n is the index of refraction. The numerical aperture of the optical fiber is expressed by the formula $$NA=(n_{core}^2-n_{clad}^2)^{1/2}$$

Therefore, the necessary diameter of the core of the single mode optical fiber 2a can be determined by the formula $2a<(V\times\lambda)/(2\pi\times NA)$. A preferred wavelength of operation for a single mode optical fiber is 1.3 µm. The diameter of the core of a single mode fluoride fiber having a wavelength of operation of 1.3 µm must be less than 6 microns. Smaller diameter core fibers and larger diameter cladding molds can be employed to make preforms for fabricating optical fibers having greater numerical apertures and/or shorter wavelengths of operation.

The optical fibers drawn from the preforms of the present invention can be examined under an interference microscope to inspect the core-clad interfaces of the optical fibers. Interference microscopy reveals that optical fibers drawn from preforms prepared in accordance with the core insertion method of the present invention have high quality core-clad interfaces that are free of crystallites.

The following examples are illustrative of the core insertion method, preforms, and optical fibers of the present invention.

EXAMPLE 1

Preparation of Core Glass and Core Fiber

ZBLAN core glass composed of $ZrF_4$ (53 mole %), $BaF_2$ (20 mole %), LaF (4 mole %) and NaF (20 mole %) doped with % $PbF_2$ to increase the index of refraction was prepared from high purity commercially available materials in a glove box under argon atmosphere. The core glass was melted in a vitreous carbon crucible at 800° C. in a 10 kW RF furnace under a sulfur hexafluoride atmosphere. The core glass was then transferred to a platinum crucible and exposed to a dilute oxygen atmosphere at 800° C. to remove carbon particles. The remaining steps of the formation of the core fiber described hereinafter were performed in a glove box. The molten glass was cooled to 600° C. before pouring it into a gold coated brass quencher having a temperature of 200° C. The quencher included a cylinder having a conical end portion disposed in a central portion of the quencher. A platinum tapered end portion having a temperature of 250° C. was mounted on a fiber drawing member attached to a carriage of the core fiber drawing and casting apparatus. The platinum tapered end portion was aligned with the conical end portion of a cylinder in the quencher by moving a platform of the apparatus in a plane perpendicular to the plane in which the carriage translates.

The platinum tapered end portion was immersed in the core material in the quencher when the temperature of the inner portion of the core material was 310° and the core material reached a viscosity of $10^6$ poises. The carriage of the apparatus was raised at a draw speed of 2.5 centimeters per second for 10 seconds. The core fiber was drawn to a length of 25 centimeters, and later cleaved to a length of about 10 centimeters.

EXAMPLE 2

Preparation of the Cladding Glass

HBLAN glass composed of $HfF_4$ (53 mole %), $BaF_2$ (20 mole %), LaF (4 mole %), $AlF_3$ (3 mole %), and NaF (20 mole %) was prepared from high purity commercially available reagents in a glove box under argon atmosphere. The cladding glass was melted in a vitreous carbon crucible at 800° C. in a glove box having an $SF_6$ atmosphere. The molten cladding glass was cooled to 600° C. and then poured into a preheated (250° C.) gold coated brass containment vessel in the glove box. The containment vessel had a diameter of 14 mm.

EXAMPLE 3

Insertion of the Core Fiber to Obtain the Preform

The core fiber of Example 1 having a temperature of 25° C. was rapidly inserted into the cladding glass of Example 2 100 seconds after the cladding glass was poured into the preform casting containment vessel. The temperature of the inner cladding layer at the time of insertion of the core fiber was 320° C. The temperature of the mold was held at 260° C. during the insertion procedure. After insertion of the core fiber, the temperature of the preform decreased to room temperature and was then removed from the casting apparatus.

The preform was drawn into a single mode fiber and inspected under an interference microscope. The preform exhibited annular interference fringes indicating that the core-clad interface was free of crystallites.

Other modifications and variations of the present invention are possible in light of the above teachings. It is therefore, to be understood that changes may be made in particular embodiments of the invention described which are within the full intended scope of the invention as defined by the claims.

What is claimed is:

1. A method of forming an optical fiber preform utilizing a movable fiber drawing member and comprising the steps of:
   a) axially aligning said fiber drawing member and a first containment vessel having a molten core material contained therein;
   b) moving at least an end portion of said fiber drawing member into said first containment vessel so as to contact the molten core material;
   c) increasing the viscosity of the core material to at least about $10^5$ poises;
   d) removing said end portion of said fiber drawing member from said first containment vessel so as to form a core fiber from said core material;
   e) cleaving said core fiber at a predetermined location spaced from said end portion of said fiber drawing member to form a core fiber having a predetermined length;
   f) aligning said predetermined length of said core fiber and a second containment vessel having a molten cladding material contained therein; and
   g) moving said fiber drawing member toward said second containment vessel and introducing said predetermined length of core fiber into an inner portion of said molten cladding material to form an optical fiber preform.

2. A method according to claim 1, wherein the step of introducing said core fiber into said cladding material is performed under vacuum or inert atmosphere.

3. A method according to claim 1, wherein said movable fiber drawing member is translational in a first plane and further wherein said step of aligning the fiber drawing member with the first containment vessel includes translating said first containment vessel in a second plane perpendicular to the first plane.

4. A method according to claim 1, wherein said step of removing said end portion of said fiber drawing member from said first containment vessel is performed when said molten core material has a viscosity of from about $10^5$ poises to about $10^7$ poises.

5. A method according to claim 1, wherein said step of removing said end portion of said fiber drawing member from said first containment vessel is performed when said molten core material has a temperature of from about 300° C. to about 330° C.

6. A method according to claim 1, wherein said step of removing said end portion of said fiber drawing member is performed when said molten core material has a temperature of about 310° C. and a viscosity value of $10^6$ poises.

7. A method according to claim 1, wherein said core fiber is drawn in said removing step at a speed from about 0.1 centimeters per second to about 5 centimeters per second.

8. A method according to claim 1, wherein said core fiber is drawn in said removing step at a speed of about 2.5 centimeters per second.

9. A method according to claim 1, wherein said end portion of said fiber drawing member is maintained at a temperature of about less than a softening temperature of said core material.

10. A method according to claim 1, wherein said end portion of said fiber drawing member is maintained at a temperature of from about 230° C. to about 260° C.

11. A method according to claim 1, wherein said movable fiber drawing member is translational in a first plane and further wherein said step of aligning said core fiber with said inner portion of said cladding material in said second containment vessel comprises translating said second containment vessel in a second plane perpendicular to the first plane.

12. A method according to claim 11, wherein said second containment vessel is translational in at least two directions within said second plane.

13. A method according to claim 1, wherein the step of introducing said core fiber into said cladding material is performed at a time when the temperature of an inner portion of the cladding material is below a crystallization temperature of said cladding material and above a glass transition temperature of said cladding material.

14. A method according to claim 1, wherein said core fiber and said cladding material each comprise a glass selected from the group consisting of silicates, borates, chalcogenides and halides.

15. A method according to claim 1, wherein said core fiber and said cladding material are each comprised of a heavy metal fluoride glass.

16. A method according to claim 15, wherein said heavy metal fluoride glass is a multicomponent glass selected from the group consisting of ZBL, ZBA, ZBLA, ZBGA, ZBLAN, HBLA and HBLAN.

17. A method according to claim 1, wherein said core fiber comprises ZBLAN glass doped with $PbF_2$.

18. A method according to claim 1, wherein said core fiber is cylindrical and has a diameter in the range of about 50 microns to about 2000 microns.

19. A method according to claim 1 wherein said core fiber is cylindrical and has a diameter of less than about 500 microns.

20. A method of making an optical fiber utilizing a movable fiber drawing member and comprising the steps of:
 a) axially aligning said fiber drawing member and a first containment vessel having a molten core material contained therein;
 b) moving at least an end portion of said fiber drawing member into said first containment vessel so as to contact the molten core material;
 c) increasing the viscosity of the core material to at least about $10^5$ poises;
 d) removing said end portion of said fiber drawing member from said first containment vessel so as to form a core fiber from said core material;
 e) cleaving said core fiber at a predetermined location spaced from said end portion of said fiber drawing member to form a core fiber having a predetermined length;
 f) aligning said predetermined length of said core fiber and a second containment vessel having a molten cladding material contained therein;
 g) moving said fiber drawing member toward said second containment vessel and introducing said predetermined length of core fiber into an inner portion of said molten cladding material to form an optical fiber preform; and
 h) drawing said preform into an optical fiber.

21. A method according to claim 20, wherein said optical fiber comprises a single mode optical fiber.

* * * * *